Nov. 23, 1954  R. W. DONLEY  2,695,042
POWER SAW CHAIN WITH INSERT TEETH
Filed Dec. 11, 1950  2 Sheets-Sheet 1
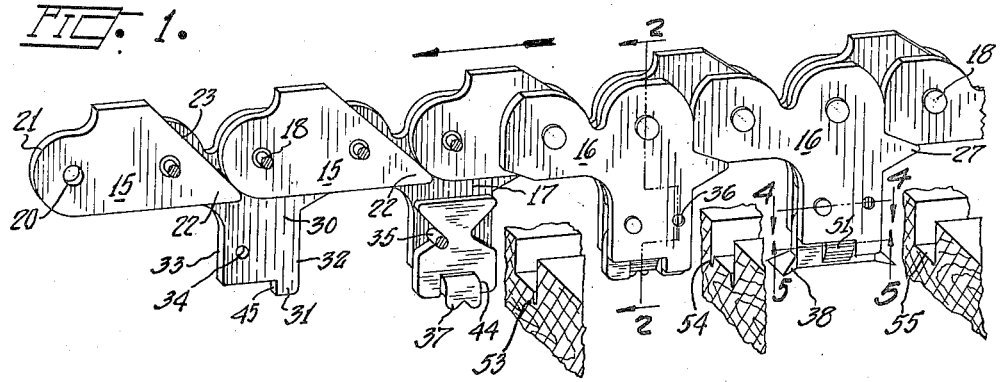
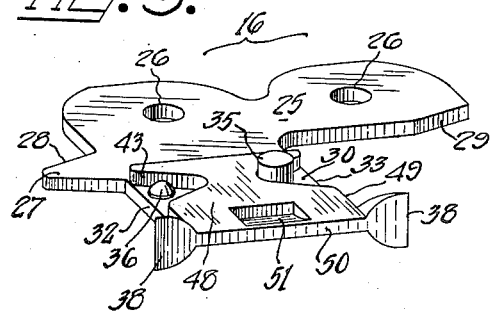
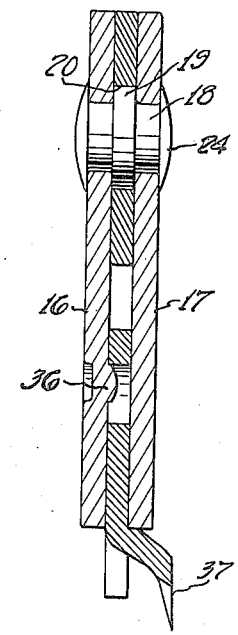
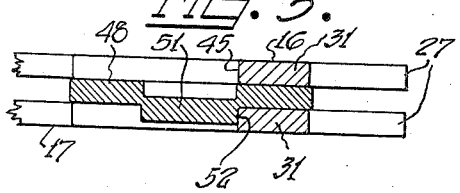
INVENTOR
RICHARD W. DONLEY
BY
ATTORNEY Nov. 23, 1954
R. W. DONLEY
2,695,042
POWER SAW CHAIN WITH INSERT TEETH
Filed Dec. 11, 1950
2 Sheets-Sheet 2
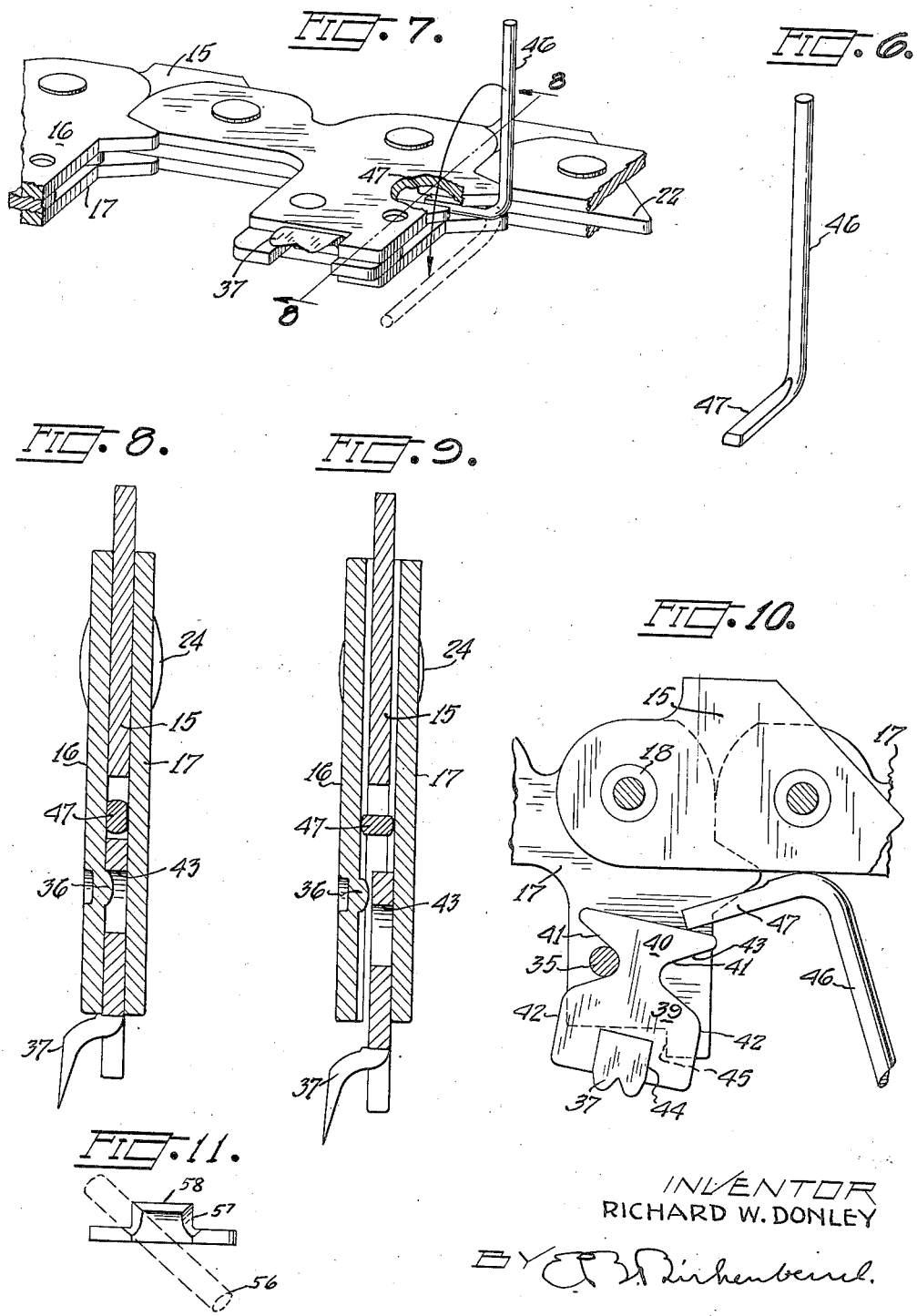
INVENTOR
RICHARD W. DONLEY
BY *signature*
ATTORNEY

United States Patent Office 2,695,042
Patented Nov. 23, 1954

2,695,042

POWER SAW CHAIN WITH INSERT TEETH

Richard W. Donley, Boise, Idaho

Application December 11, 1950, Serial No. 200,208

3 Claims. (Cl. 143—135)

This invention relates generally to saws for wood and particularly to a power saw insert chain.

The main object of this invention is to provide a chain saw with which the maximum cutting efficiency can be obtained.

The second object is to almost entirely eliminate break-down time commonly required for the filing and replacement of teeth.

The third object is to increase the life of the chain saw by making it possible to have the life of the teeth match the life of the chain parts and to simplify the tooth replacement.

The fourth object is to provide a chain saw whose cutters and rakers may be correctly related to the type of wood and cutting speed, both as to the number and arrangement of cutters and rakers for a given length of chain, making the chain adaptable to a wide variety of cutting conditions and requirements.

The fifth object is to produce a chain saw having a high cutting speed in which the cutters and rakers cut independently of one another with a free, smooth action requiring a minimum of power.

The sixth object is to improve the conveying or dust removing action of the chain, thereby avoiding the stringing of the saw dust along the kerf which would cause a useless re-cutting thereof.

The seventh object is to produce a non-binding chain saw.

The eighth object is to secure a true cutting saw due to the nature and relationship of the teeth.

The ninth object is to produce a chain saw whose teeth will tend to bite into the wood which is especially desirable on one man saws.

I accomplish these and other objects in the manner set forth in the following specification as illustrated in the accompanying drawing, in which Fig. 1 is a fragmentary perspective view of a section of the saw chain showing the construction and also showing the type of cut made by each cutter.

Fig. 2 is a section taken along the line 2—2 in Fig. 1.

Fig. 3 is a perspective view of a side plate on which the slight projection is formed and showing the cutter in position.

Fig. 4 is a section taken along the line 4—4 in Fig. 1.

Fig. 5 is a section taken along the line 5—5 in Fig. 1.

Fig. 6 is a perspective view of a releasing key.

Fig. 7 is a perspective view of a portion of the chain with the key inserted.

Fig. 8 is a section taken along the line 8—8 in Fig. 7.

Fig. 9 is a section similar to Fig. 8 but showing the chain plate sprung outwardly to release the cutter.

Fig. 10 is a fragmentary view showing the key used as a pry bar to eject the cutter teeth and in which the outer plate has been removed to better show the action.

Fig. 11 is a side elevation of a modified form of a cutter tooth shaped to permit sharpening with a round file.

Referring in detail to the drawings there is shown a saw chain which consists of the inner links 15 and the outer links 16 and 17, which are joined by the shouldered rivets 18 whose enlarged central portions 19 are free to rock in the openings 20 in the links 15. This type of chain is referred to as a block link chain.

Each link 15 has a rounded end 21 and the pointed end 22 whose sloping side 23 engages the rounded end 21 of the adjacent link 15. The rivets 18 are secured by the rivet heads 24 to the side links 16 and 17.

The side links 16 and 17 are alike in outline and consist of an elongated body 25 having the holes 26 for the reduced ends of the rivets 18 and having a projecting lug 27 whose face 28 contacts a corresponding face 29 at the end of the next adjacent link 16 when the link rivets are in straight alignment and move away therefrom when the links pass around a sprocket wheel. From the links 16 and 17 project the tooth holding shank 30, each of which has a tooth driving lug 31 projecting from the rearward edge 32. Near the opposite edge 33 of the shank 30 is formed a hole 34 for the rivet 35 which holds the plates 16 and 17 at a fixed spacing along the edge 33 but permits the edges 32 to be sprung apart for the insertion or removal of a tooth. The plates 16 and 17 differ from each other only in the punchout 36 which is formed in the shank 30 near the edge 32.

There are only two kinds of teeth: namely, cutter teeth 37 and raker teeth 38.

The cutter teeth 37 are formed in pairs extending laterally from the middle of the square end 39 of the cutter tooth shank 40 having the V-shaped notches 41 in opposite edges 42. The notches are shaped to receive the rivet 35 on one side and to have the edge 43 engage the punchout 36 when the teeth 37 are in a cutting position, at which time the edge 44 of the teeth 37 engages the edge 45. The teeth 37 may be turned to the right or left.

To insert or remove a cutting tooth, there is provided an angular wrench 46 whose flattened portion 47 makes it possible to insert it between the plates 16 on the end remote from the pin 35 and by turning the wrench 46 to the position shown in Fig. 9 causing these portions of the plates to spread and to allow the tooth shank 40 to pass the punchout 36. The wrench can be turned as shown in Fig. 10 to force the tooth out of its working position.

The raker teeth 38 are formed in pairs projecting oppositely from the shank 48 which is provided with the same notches 41 as are the shanks 40. The raker teeth 38 project beyond the ends 49 of the shanks 48. In the middle of the shank 48, along the edge 50, is formed an elongated punchout 51 which produces a shoulder 52 which engages the edge 45 of the lug 31.

The manner of inserting and removing a raker tooth 38 is the same as for the cutter tooth 37.

It will be seen in Fig. 1 that the stages of the cut are clearly shown. In this view the cut 53 is formed by the left hand cutter teeth 37 while the cut 54 is formed by the right hand cutter teeth 37 and the cut 55 is formed by the raker teeth 38 which cut out the wood between the side cuts 54 and 55.

It can be seen that I have provided a saw which is not only low in cost due to the shape of the parts and the use of only two kinds of teeth but the teeth can be inserted and removed with little effort making the maintenance cost very low.

One of the chief advantages of this type of saw is the small amount of time required for filing. In the form of tooth shown in Fig. 11, a straight round file 56 is used to sharpen the edges 57 of the side cutter tooth 58.

I claim:

1. A saw chain comprised of a single row of central driving links and a double row of connecting side links arranged in pairs, shouldered rivets uniting said center links between adjacent pairs of side links, permitting limited lateral movement each of said side links having a tooth holding shank projecting therefrom at one end of and in the plane of said side link, a rivet holding one edge of one pair of shanks at a fixed spacing, one of said one pair of shanks having a punch-out therein along the edge of the shank opposite the rivet, and a tooth having a shank at one end occupying the space between the tooth holding shanks, said tooth shank having V-notches formed in opposite edges, one of said notches engaging the rivet and the other notch engaging the punchout.

2. A chain for power saws comprising a block link chain whose block links overlap to limit the bending of said chain to a straight line in one direction and to permit it turning around a sprocket wheel in the opposite direction, the side links in said chain having spaced lateral tooth holding shanks, one of said shanks having a punch-out extending into the space between said shanks and a rivet extending through both of said shanks and across the space between same, said shanks having their ends relatively yieldable in a transverse direction.

3. A saw chain comprising a single row of center drive links and a double row of outer tooth carrying links arranged in pairs with one outer link on each side of each center link, each outer link having a tooth holding shank projecting outwardly therefrom, said tooth holding shanks being relatively yieldable and having a space therebetween, a punchout on the shank of one of the pairs of outer teeth extending into said space, a rivet passing through both shanks, a tooth extending into said space having V-notches in the leading and trailing edges thereof, one of said notches engaging the punch-out and the other notch engaging said rivet, the trailing end of each tooth holding shank having a driving lug thereon, said tooth having a laterally projecting cutter bit, the trailing edge of which engages a tooth driving lug.

References Cited in the file of this patent

UNITED STATES PATENTS

| Number | Name | Date |
|---|---|---|
| 873,666 | Gray et al. | Dec. 10, 1907 |
| 1,339,091 | Benefiel | May 4, 1920 |
| 1,979,001 | Kankos | Oct. 30, 1934 |
| 2,326,854 | Hassler | Aug. 17, 1943 |

FOREIGN PATENTS

| Number | Country | Date |
|---|---|---|
| 29,213 | Great Britain | Dec. 16, 1910 |